United States Patent
Ueta (10) Patent No.: US 9,936,091 B1
(45) Date of Patent: Apr. 3, 2018

(54) IMAGE PROCESSING APPARATUS HAVING A FUNCTION FOR CONTROLLING SOUND LEVELS OF THE IMAGE FORMING APPARATUS AND METHOD FOR CONTROLLING SOUND LEVEL OF THE IMAGE FORMING APPARATUS

(71) Applicants: KABUSHIKI KAISHA TOSHIBA, Tokyo (JP); TOSHIBA TEC KABUSHIKI KAISHA, Tokyo (JP)

(72) Inventor: Tsutomu Ueta, Yaizu Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/274,538

(22) Filed: Sep. 23, 2016

(51) Int. Cl.
*H04N 1/00* (2006.01)
*H04N 1/44* (2006.01)
*H04N 1/40* (2006.01)

(52) U.S. Cl.
CPC ..... *H04N 1/00822* (2013.01); *H04N 1/40056* (2013.01); *H04N 1/442* (2013.01); *H04N 2201/0094* (2013.01)

(58) Field of Classification Search
CPC ................................................ H04N 1/00822
USPC ....................................................... 358/1.13
See application file for complete search history.

(56) References Cited

U.S. PATENT DOCUMENTS

| | | | | |
|---|---|---|---|---|
| 2011/0144999 | A1* | 6/2011 | Jang | G06K 9/00892 704/270.1 |
| 2014/0160505 | A1* | 6/2014 | Tachikawa | H04N 1/00891 358/1.13 |
| 2015/0227328 | A1* | 8/2015 | Yokoyama | G06F 3/1221 358/1.14 |
| 2017/0085745 | A1* | 3/2017 | Shiraishi | H04N 1/32776 |

FOREIGN PATENT DOCUMENTS

JP    2008-225321    9/2008

* cited by examiner

*Primary Examiner* — Jacky X Zheng
(74) *Attorney, Agent, or Firm* — Patterson & Sheridan, LLP (57) ABSTRACT

An embodiment includes an image processing apparatus. A driving unit drives at least one mechanism of the image processing apparatus. A network interface receives location information which indicates the presence or absence of a person in a surrounding area of the image forming apparatus at a time of a requested function of the image processing apparatus. A control unit determines, based on the received location information, whether the person is present in the surrounding area of the image forming apparatus. The control unit controls the driving unit so that, when the person is determined to be present, the at least one mechanism is driven in a first operating mode causing noise at a first volume, and, when the person is not determined to be present, the at least one mechanism is driven in a second operating mode causing noise at a second volume louder than the first volume.

20 Claims, 5 Drawing Sheets

| DISTANCE RANGE | QUIET TRANSPORT SPEED [m/s] | QUIET OPERATING SPEED [m/s] |
|---|---|---|
| GREATER THAN OR EQUAL TO 9 m | cv4 | ev4 |
| GREATER THAN OR EQUAL TO 6 m AND LESS THAN 9 m | cv3 | ev3 |
| GREATER THAN OR EQUAL TO 3 m AND LESS THAN 6 m | cv2 | ev2 |
| GREATER THAN OR EQUAL TO 0 m AND LESS THAN 3 m | cv1 | ev1 |

IMAGE PROCESSING APPARATUS HAVING A FUNCTION FOR CONTROLLING SOUND LEVELS OF THE IMAGE FORMING APPARATUS AND METHOD FOR CONTROLLING SOUND LEVEL OF THE IMAGE FORMING APPARATUS

FIELD

Embodiments described herein relate generally to an image processing apparatus and a control method.

BACKGROUND

In the related art, an image forming apparatus such as a multifunction peripheral (MFP) reduces the level of operating sound by decreasing, for example, a transport speed at which a sheet on which an image is formed, is transported during operation. The image forming apparatus measures the level of sound in the surrounding area of the image forming apparatus and determines the presence or the absence of a person in the surrounding area with the measured level of sound. Then, the image forming apparatus changes the transport speed according to the determination result.

However, since such an image forming apparatus determines the presence or the absence of a person in the surrounding area with the level of sound, the image forming apparatus may determine the absence even though, in actuality, a person exists quietly in the surrounding area of the image forming apparatus. Thus, the method of detecting a person in the surrounding area of the image forming apparatus may not be accurate.

DETAILED DESCRIPTION

An embodiment includes an image processing apparatus. A driving unit drives at least one mechanism of the image processing apparatus. A network interface receives location information which indicates the presence or absence of a person in a surrounding area of the image forming apparatus at a time of a requested function of the image processing apparatus. A control unit determines, based on the received location information, whether the person is present in the surrounding area of the image forming apparatus. The control unit controls the driving unit so that, when the person is determined to be present, the at least one mechanism is driven in a first operating mode causing noise at a first volume, and, when the person is not determined to be present, the at least one mechanism is driven in a second operating mode causing noise at a second volume louder than the first volume.

Hereinafter, an image processing apparatus according to an embodiment will be described with reference to the drawings. The same configurations will be designated by the same reference signs in each drawing. Hereinafter, an image forming apparatus 100 will be illustratively described as one example of the image processing apparatus.

(Outline of Image Forming Apparatus)

First, an outline of the image forming apparatus 100 will be described. Hereinafter, the image forming apparatus 100 will be illustratively described as being provided in an office. The office in this example is a room or a building in which a user who uses the image forming apparatus 100 works. The image forming apparatus 100 may be provided in another indoor location such as an indoor event venue, a private room or building instead of the office. The image forming apparatus 100 may be provided in another outdoor location such as an outdoor event venue instead of the office.

The image forming apparatus 100 includes a driving unit. The driving unit is a functional unit that represents, for example, motors, that drive various mechanisms when the image forming apparatus 100 is operated. The mechanisms driven by the driving unit includes an original document transport roller, an original document transport motor, a polygon mirror, a development roller, a toner agitation member, a transfer roller, a fixing roller, and a fixing belt. The mechanisms driven by the driving unit further includes a sheet transport roller and a sheet transport motor. The original document transport roller transports an original document. The polygon mirror reflects a laser beam that forms an electrostatic latent image on a photoreceptor. The sheet transport roller transports a sheet. The mechanisms driven by the driving unit may include, instead of a portion or the entirety of these functional units, other functional units that are driven when the image forming apparatus 100 is operated, or may include only a part of these functional units.

An administrator stores, in advance, registree information in the image forming apparatus 100. The administrator in this example is an administrator of the image forming apparatus 100. The registree information indicates a registree. A registree is a person who is determined by the administrator to be a person sitting on a seat included in the surrounding area of the image forming apparatus 100. The surrounding area of the image forming apparatus 100 is, for example, a region included in a circular region that has a predetermined radius around the image forming apparatus 100 in the region of the office. The predetermined radius is, for example, three meters. The predetermined radius may be a distance shorter or longer than three meters. The registree may be any person as long as the person is permitted by the administrator to register as a registree in the image forming apparatus 100. That is, the registree may be the administrator or another person who uses the image forming apparatus 100 in the office.

The image forming apparatus 100 obtains location information that indicates the location of a registree. Specifically, the location information is, for example, schedule information of a registree. The schedule information of a registree is information that indicates the presence of a schedule of the registree at the current time. The image forming apparatus 100, in a case where the location information is the schedule information, obtains the schedule information generated by a schedule management application, described later, as the location information. Then, the image forming apparatus 100 determines a registree to be present in a surrounding area in a case where the schedule information indicates that the registree has no event scheduled at the current time. The surrounding area is the surrounding area of the image forming apparatus 100. The reason of the determination is that a registree is highly likely to be present on the seat of the registree in a case where the registree has no event scheduled at the current time. Meanwhile, the image forming apparatus 100 determines a registree not to be present in a surrounding area in a case where the schedule information indicates that the registree has an event scheduled at the current time. The surrounding area is the surrounding area of the image forming apparatus 100. The reason of the determination is that a registree is highly unlikely to be present on the seat of the registree in a case where the registree has a schedule.

The location information may be attribute information of a registree instead of the schedule information. The attribute information of a registree can be attributes that can be detected at the location of the registree, except for attributes obtained through vibration of air (for example, volume and the like). The attribute may be the weight of the registree, the body temperature of the registree, a vibration caused by the registree shaking the seat or desk of the registree, or the like. The image forming apparatus 100, in a case where the location information is the attribute information, obtains the attribute information from a sensor that is provided in an object correlated with the registree, such as the registree's seat, desk, and the like. In a case where a value of the attribute information detected by the sensor in the registree's seat, for example, is greater than or equal to a predetermined threshold, the image forming apparatus 100 determines that the location of the registree is the seat. That is, the detection of attribute information indicates the location of the registree. In this case, the image forming apparatus 100 determines the registree to be present in a surrounding area. The surrounding area is the surrounding area of the image forming apparatus 100. The reason of the determination is that the registree is highly likely to be present on the seat of the registree in a case where the detected value of the attribute is greater than or equal to the predetermined threshold. Specifically, a registree is considered to be sitting on the seat in a case where the weight detected by a weight sensor provided in the seat is greater than or equal to the predetermined threshold. That is, in that case, the registree is highly likely to be present on the seat of the registree. Meanwhile, in a case where the attribute indicated by the attribute information is less than the predetermined threshold, the image forming apparatus 100 determines the location of the registree not to be the seat of the registree. In this case, the image forming apparatus 100 determines the registree not to be present in a surrounding area. The surrounding area is the surrounding area of the image forming apparatus 100. The reason of the determination is that the registree is highly unlikely to be present on the seat of the registree in a case where the detected value of the attribute is less than the predetermined threshold. Specifically, a registree is considered not to be sitting on the seat in a case where the weight detected by the weight sensor provided in the seat is less than the predetermined threshold. That is, in that case, the registree is highly unlikely to be present on the seat of the registree.

The location information may be another type of information that indicates the location, such as detection information of a registree. The detection information of a registree indicates that the registree is detected. The detection information is biometric information that indicates that the face of the registree is detected, or information that indicates that a fingerprint of the registree is detected. The image forming apparatus 100, in a case where the location information is the detection information, obtains the detection information from a sensor that is provided near an object correlated with the registree, such as the seat, the desk, and the like of the registree. The sensor is a sensor such as a facial verification sensor that verifies the face, or a fingerprint verification sensor that verifies the fingerprint. Then, the image forming apparatus 100, for example, in a case where the detection information indicates that the face, the fingerprint, or the like of a registree is detected, determines the registree to be present in a surrounding area. The surrounding area is the surrounding area of the image forming apparatus 100. The reason of the determination is that, in that case, the registree is highly likely to be present on the seat of the registree. Specifically, a registree is considered to be sitting on the seat in a case where the detection information that indicates that the registree is detected from a facial verification sensor is obtained. The facial verification sensor is a facial verification sensor provided near the seat of the registree. That is, in that case, the registree is highly likely to be present on the seat of the registree. Meanwhile, in a case where the detection information indicates that the face, the fingerprint, or the like of a registree is not detected, the image forming apparatus 100 determines the registree not to be present in a surrounding area. The surrounding area is the surrounding area of the image forming apparatus 100. The reason of the determination is that, in that case, the registree is highly unlikely to be present on the seat of the registree. Specifically, a registree is considered not to be sitting on the seat in a case where the detection information that indicates that the registree is not detected from a facial verification sensor is obtained. The facial verification sensor is provided near the seat of the registree. That is, in that case, the registree is highly unlikely to be present on the seat of the registree.

Hereinafter, the location information will be illustratively described as the schedule information, for example. As described above, the location information may be the attribute information, the detection information, or the like. That is, the image forming apparatus 100 obtains the location information that indicates the location of a registree. The image forming apparatus 100 determines whether or not a registree is present in a surrounding area, based on the obtained location information. The surrounding area is the surrounding area of the image forming apparatus 100. The image forming apparatus 100 drives the driving unit in a first operating mode in a case where a registree is determined to be present in the surrounding area. In the first operating mode, at least a part of the driving unit is quietly operated compared with a case where a registree is determined not to be present in the surrounding area. Accordingly, the image forming apparatus 100 can be rendered quiet during operation. Hereinafter, the sheet transport roller and the fixing roller included in the driving unit will be illustratively described as the at least a part of the driving unit that is driven in the first operating mode by the image forming apparatus 100.

(Details of Image Forming Apparatus)

Hereinafter, details of the image forming apparatus 100 will be described with reference to FIG. 1.

Figure 1:
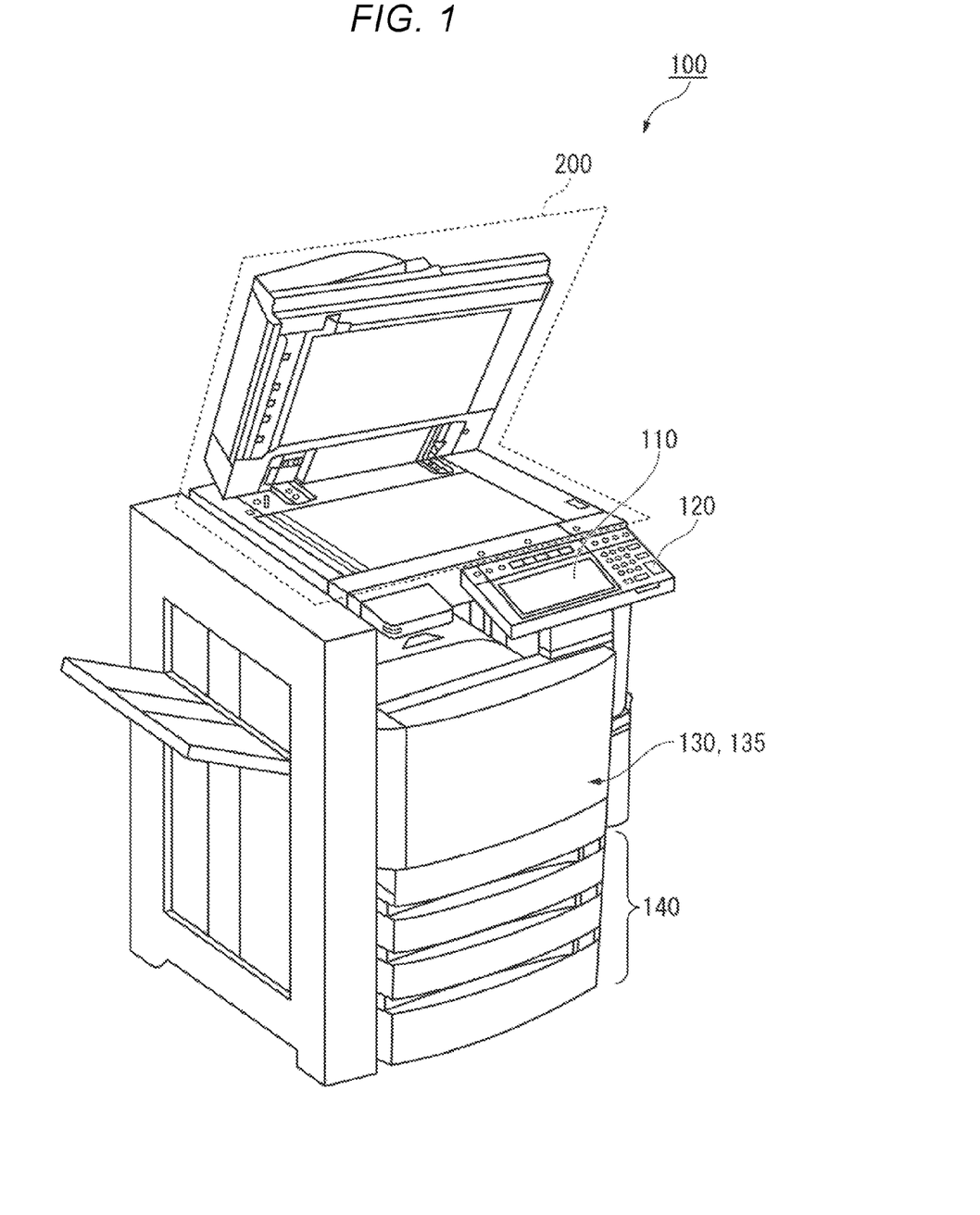
FIG. 1 is an exterior view illustrating an overall configuration example of an image forming apparatus according to an embodiment.

FIG. 1 is an exterior view illustrating an overall configuration example of the image forming apparatus 100 according to the embodiment. The image forming apparatus 100 is, for example, a multifunction peripheral. The image forming apparatus 100 includes a display 110, a control panel 120, a printer unit 130, a developer accommodation unit 135, a sheet accommodation unit 140, and an image reading unit 200. The printer unit 130 of the image forming apparatus 100 may be a device of an electrophotographic type that fixes toner images, or a device of an inkjet type.

The image forming apparatus 100 forms images on a sheet using a developer such as toner. The sheet is, for example, paper. The sheet may be of any type, provided that the image forming apparatus 100 can form images on the surface thereof.

The display 110 is an image display device such as a liquid crystal display or an organic electroluminescent (EL) display. The display 110 displays various information related to the image forming apparatus 100.

The control panel 120 includes a plurality of buttons. The user performs an operation on the control panel 120. The control panel 120 outputs a signal corresponding to the operation performed by the user to a control unit of the image forming apparatus 100. The display 110 and the control panel 120 may serve as a single body touch panel.

The printer unit 130 forms images on the sheet based on image information generated by the image reading unit 200 or image information received through a communication line. The printer unit 130 performs, for example, the following processes to form images. The printer unit 130 forms an electrostatic latent image on a photoreceptor drum based on the image information. The printer unit 130 causes a developer to cling to the electrostatic latent image and thereby forms a visible image. Toner is a specific example of the developer. A transfer unit of the printer unit 130 transfers the visible image onto the sheet. A fixing unit of the printer unit 130 applies heat and pressure to the sheet and thereby fixes the visible image on the sheet. The sheet on which images are formed may be a sheet accommodated in the sheet accommodation unit 140 or a sheet manually inserted. The fixing unit is one example of a fixing device. A transport unit of the printer unit 130 transports the sheet during operation of the printer unit 130.

The developer accommodation unit 135 accommodates the developer that is used for formation of the visible image in the printer unit 130.

The sheet accommodation unit 140 accommodates the sheet that is used for formation of images in the printer unit 130.

The image reading unit 200 reads image information of a reading target that is formed on an original document. The image reading unit 200 stores the read image information. The stored image information may be sent to another information processing apparatus through a network. The stored image information may be formed as an image on the sheet by the printer unit 130.

The image forming apparatus 100 in this embodiment may also be an image reading device. The image reading device is, for example, a scanner. The image reading device reads a plurality of sheets to generate digital data and an image file.

(Functional Configuration of Image Forming Apparatus)

Hereinafter, a hardware configuration of the image forming apparatus 100 will be described with reference to FIG. 2.

Figure 2:
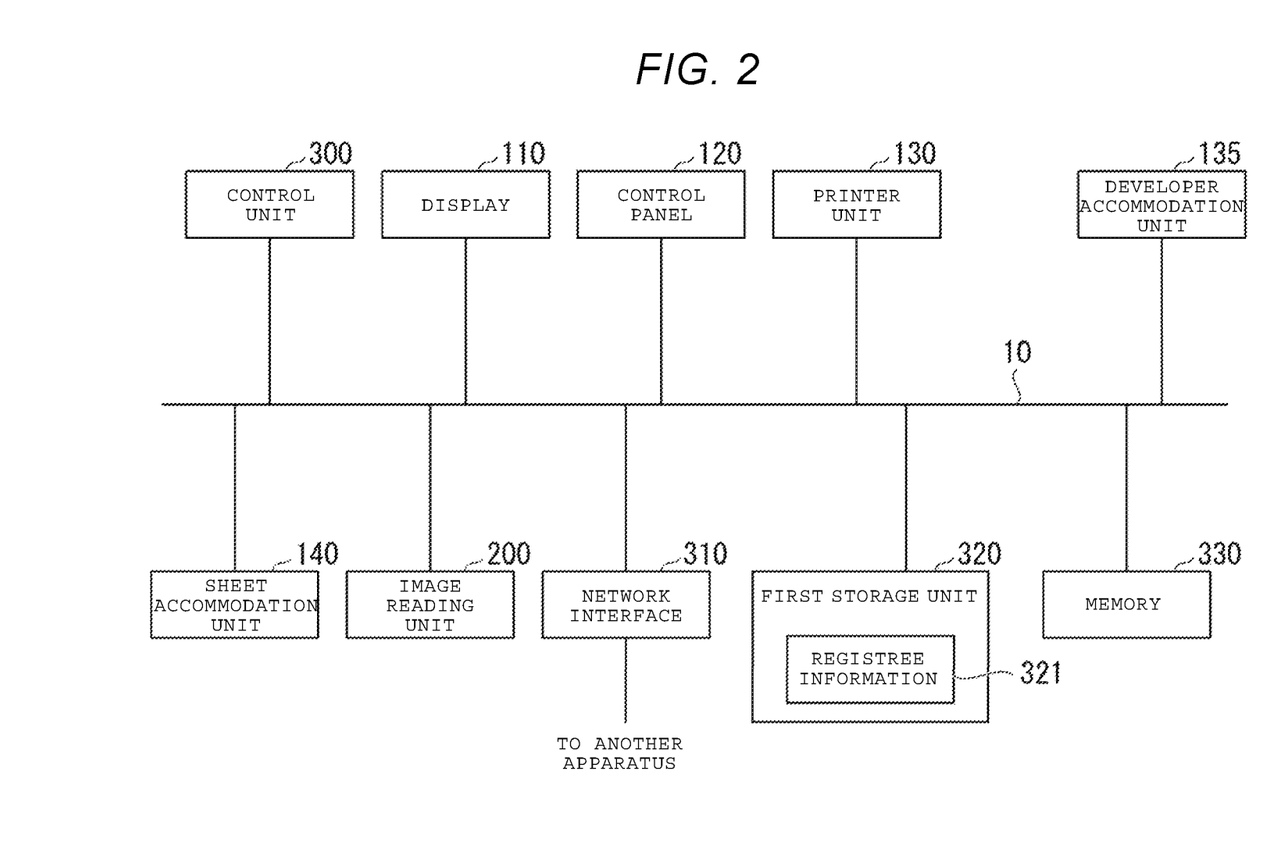
FIG. 2 is a diagram illustrating a functional configuration example of the image forming apparatus.

FIG. 2 is a diagram illustrating a functional configuration example of the image forming apparatus 100.

The image forming apparatus 100 includes a control unit 300, the display 110, and the control panel 120. The image forming apparatus 100 includes the printer unit 130, the developer accommodation unit 135, the sheet accommodation unit 140, and the image reading unit 200. The image forming apparatus 100 includes a network interface 310, a first storage unit 320, and a memory 330. These functional units included in the image forming apparatus 100 are communicably connected to each other through a system bus 10.

The display 110, the control panel 120, and the printer unit 130 are in the same manner as described above, and thus will not be described. The developer accommodation unit 135, the sheet accommodation unit 140, and the image reading unit 200 are in the same manner as described above, and thus will not be described. Hereinafter, the control unit 300, the network interface 310, the first storage unit 320, and the memory 330 will be described.

The control unit 300 includes a central processing unit (CPU) of the image forming apparatus 100. The control unit 300 controls operation of each functional unit of the image forming apparatus 100. The control unit 300 performs various processes by executing programs. The control unit 300 obtains, from the control panel 120, instructions that are input by the user. The control unit 300 performs control processes based on the obtained instructions.

The network interface 310 performs data communication with another apparatus. The network interface 310 operates as an input interface and receives data that is sent from another apparatus. The network interface 310 operates as an output interface as well and sends data to another apparatus.

The first storage unit 320 is an auxiliary storage device such as a hard disk and a solid-state drive (SSD). The first storage unit 320 stores various data. The various data include, for example, registree information 321.

The registree information 321 indicates each of one or more registrees. The registree information 321 is, for example, identification information (ID) that indicates each of the one or more registrees. The registree information 321 may be another type of information that indicates each of the one or more registrees, instead of the ID. The other type of information is, for example, an Internet Protocol (IP) address. The IP address is an IP address that is assigned to a personal computer (PC) operated by each of the one or more registrees.

The memory 330 is, for example, a random access memory (RAM). The memory 330 temporarily stores data used by each functional unit included in the image forming apparatus 100. The memory 330 may store data generated by the image reading unit 200, programs that operate each functional unit, and the like.

(Functional Configuration of Control Unit)

Hereinafter, a functional configuration of the control unit 300 will be described with reference to FIG. 3.

Figure 3:
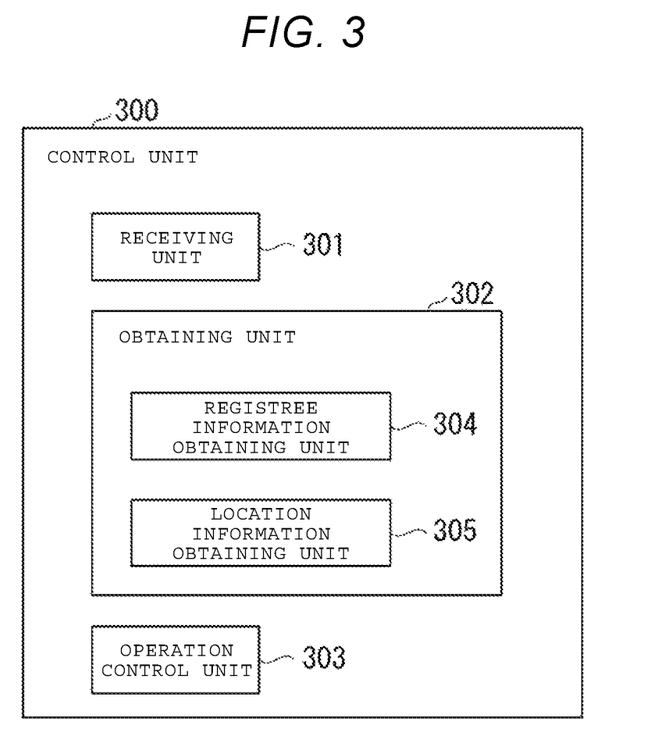
FIG. 3 is a diagram illustrating a functional configuration example of a control unit.

FIG. 3 is a diagram illustrating a functional configuration example of the control unit 300. The control unit 300 includes a receiving unit 301, an obtaining unit 302, and an operation control unit 303. The obtaining unit 302 includes a registree information obtaining unit 304 and a location information obtaining unit 305.

The receiving unit 301 determines whether or not the network interface 310 receives print data. The receiving unit 301, in a case where the network interface 310 receives the print data, determines that an instruction to form an image is received. The receiving unit 301 determines whether or not a printing operation is performed on the control panel 120. The receiving unit 301, in a case where the operation is determined to be performed on the control panel 120, determines that the instruction is received.

The registree information obtaining unit 304 obtains, from the first storage unit 320, the registree information 321 that is stored in advance in the first storage unit 320. The registree information 321 may be stored in another server instead of the first storage unit 320. The other server is communicably connected to the image forming apparatus 100. In this case, the registree information obtaining unit 304 obtains the registree information 321 from the other server.

The location information obtaining unit 305 obtains the location information from a predetermined second storage unit based on the registree information 321 obtained by the registree information obtaining unit 304. The predetermined second storage unit will be described later.

The operation control unit 303 determines whether or not a registree is present in a surrounding area, based on the location information obtained by the location information obtaining unit 305. The surrounding area is the surrounding area of the image forming apparatus 100. The operation control unit 303, in a case where a registree is determined to be present in the surrounding area, drives the at least a portion of the mechanisms driven by the driving unit in the first operating mode. More specifically, in that case, the operation control unit 303 decreases the speed at which the mechanism is driven in the first operating mode.

(Flow of Process Performed by Image Forming Apparatus)

Figure 4:
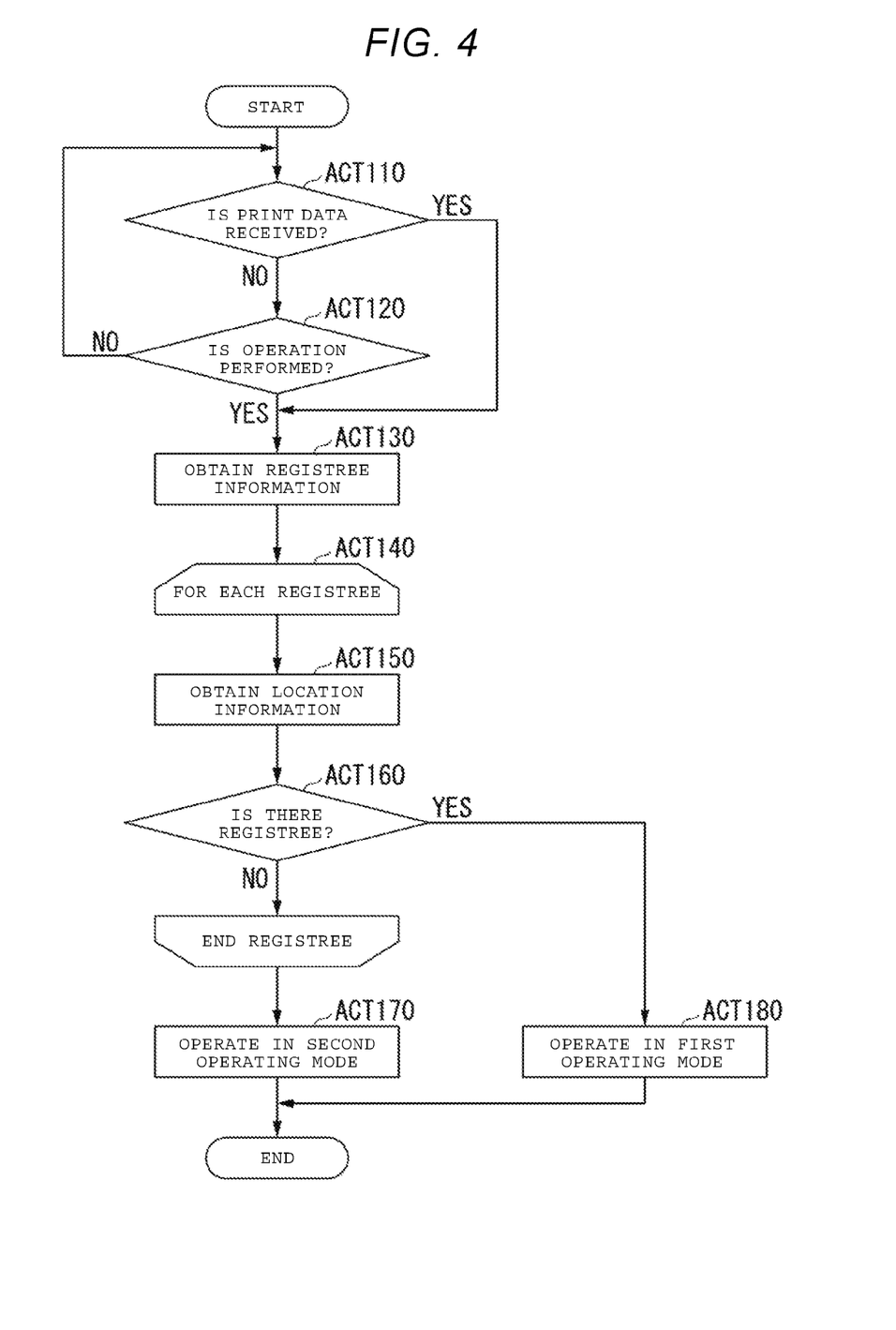
FIG. 4 is a diagram illustrating one example of the flow of a process performed by the image forming apparatus.

Hereinafter, the flow of a process performed by the image forming apparatus 100 will be described with reference to FIG. 4. FIG. 4 is a diagram illustrating one example of the flow of the process performed by the image forming apparatus 100.

The receiving unit 301 determines whether or not the network interface 310 receives print data (ACT110). The receiving unit 301 determines that an instruction is received, in a case where the network interface 310 is determined to receive the print data (YES in ACT110). The instruction is an instruction to form an image. Then, the registree information obtaining unit 304 transitions to ACT130. Meanwhile, the receiving unit 301 determines that an instruction is not received, in a case where the network interface 310 is determined not to receive the print data (NO in ACT110). The instruction is an instruction to form an image. Then, the receiving unit 301 transitions to ACT120.

In ACT120, the receiving unit 301 determines whether or not a printing operation is performed on the control panel 120 (ACT120). The receiving unit 301 determines that an instruction is not received, in a case where the operation is determined not to be performed on the control panel 120 (NO in ACT120). The instruction is an instruction to form an image. Then, the receiving unit 301 transitions to ACT110 and again determines whether or not print data is received. Meanwhile, the receiving unit 301 determines that an instruction is received, in a case where the operation is determined to be performed on the control panel 120 (YES in ACT120). The instruction is an instruction to form an image. The instruction is one example of an instruction to perform an operation that accompanies driving of the at least a part of the driving unit. Then, the registree information obtaining unit 304 transitions to ACT130.

In ACT130, the registree information obtaining unit 304 obtains the registree information 321 from the first storage unit 320 (ACT130).

Next, the location information obtaining unit 305 and the operation control unit 303 repeat the processes of ACT150 to ACT160 for each of one or more registrees (ACT140). The one or more registrees are one or more registrees indicated by the registree information 321 that the registree information obtaining unit 304 obtains from the first storage unit 320 in ACT130.

The location information obtaining unit 305 obtains the location information of the registree selected in ACT140 from the second storage unit (ACT150). Hereinafter, the registree will be referred to as a target registree for convenience of description. The process of ACT150 will be described. The second storage unit may be a portion of a storage region of the first storage unit 320 or a portion of a storage region of a server S1. The server S1 is another server that is communicably connected to the image forming apparatus 100. In either case, the second storage unit stores the location information that is correlated with target person information. The target person information indicates each of one or more target persons. A target person is a person of a target whose schedule is managed in the office.

As described above, the location information is described as being the schedule information, for example, but is not thereby limited. A location management application stores the schedule information in the second storage unit. The location information application in this example is an application program that generates the schedule information and stores the schedule information in the second storage unit. The location information application may be a dedicated application program that generates and stores the schedule information. The location information application may be an existing general-purpose application program that generates and stores the schedule information, such as a schedule management tool. Hereinafter, the location information application will be illustratively described as being installed in the image forming apparatus 100. Specifically, the location information application is performed by the control unit 300. In this case, the second storage unit is a portion of the storage region of the first storage unit 320. The second storage unit is a portion of the storage region of the server S1, and the location application is performed by the controller in server S1 in a case where the location information application is installed in the server S1.

The location information application, for example, in a case where the location information application is a schedule management tool, generates the schedule information based on a schedule of each target person. The schedule is input by each target person from a PC of each target person into the schedule information application by communication. Specifically, the location information application, based on the schedule, generates the schedule information correlated with the corresponding target person information. The location information application stores the generated schedule information in the second storage unit.

The location information application may generate the schedule information based on work arriving and leaving information stored in a server S2. The work arriving and leaving information is correlated with the target person information which indicates each target person. The server S2 stores the work arriving and leaving information correlated with the target person information. The work arriving and leaving information is, for example, a work arriving and leaving time of the target person that is stored in the server S2 by a time recorder. The work arriving and leaving time represents any of times of a work arriving time, a work leaving time, an outgoing return time, and an outgoing time. The outgoing return time of a target person represents the time at which the target person returns to the office from an outgoing destination. The outgoing time of a target person represents the time at which the target person goes out of the office. The location information application determines a target person is present in a case where the most recent work arriving and leaving time of the target person represents either the work arriving time or the outgoing return time of the target person. Meanwhile, the location information application determines the target person is not present in a case where the most recent work arriving and leaving time represents either the work leaving time or the outgoing time of the target person. The location information application generates the schedule information based on the result of such determinations and the target person information which indicates the target person.

The location information application may determine whether or not a target person is present, based on an IP address assigned to the PC of the target person. In this case, the location information application determines whether or not the PC is started, based on the IP address. Then, the location information application, in a case where the PC is determined to be started, determines that the target person is present. Meanwhile, the location information application, in a case where the PC is determined not to be started, determines that the target person is not present.

The location information application may perform the following processes. The location information application determines whether or not a registree is present, based on in-time operation information of the registree. The in-time operation information indicates whether or not the PC of the registree is operated within a predetermined amount of time. Specifically, the location information application obtains the in-time operation information from the server S2. The location information application determines whether or not the registree is present, based on the obtained in-time operation information. The location information application, in a case where the PC is operated in a predetermined amount of time, determines that the registree is present.

The location information application may calculate the distance from a seat of a target person to the target person. In this case, the location information application determines whether or not the target person is present, based on the calculated distance. The seat is determined in advance in the office. In this case, the server S2 stores, in advance, seat information that indicates the position of the seat of the target person in the office. The location information application obtains the seat information from the server S2. The location information application, for example, detects the position of the target person in the office based on the amount of time required for communication. The communication is between each of a plurality of Wi-Fi (registered trademark) access points and a portable terminal. Then, the location information application calculates the distance from the position indicated by the obtained seat information to the detected position of the target person in the office. The location information application determines whether or not the target person is present, based on as to whether or not the calculated distance is less than a predetermined distance. The location information application, in a case where the calculated distance is determined to be less than the predetermined distance, determines that the target person is present. Meanwhile, the location information application, in a case where the distance is determined to be greater than or equal to the predetermined distance, determines that the target person is not present. The predetermined distance is, for example, three meters and may be a distance shorter than three meters or a distance longer than three meters.

The location information application may determine whether or not a target person is present, by using a presence sensor that is a sensor provided in a seat of the target person. The seat is determined in advance in the office. The presence sensor may be any sensor provided that the sensor can detect whether or not the target person is sitting on the seat. The presence sensor is, for example, a temperature sensor, a fingerprint verification sensor, a facial verification sensor that verifies the face of the target person, or a pressure sensor that detects pressure when the target person sits on the seat. In this case, the location information application determines whether or not the target person is present, based on an output value from the presence sensor.

When the location information is obtained from the second storage unit in ACT150, the location information obtaining unit 305 performs processes described below. The location information obtaining unit 305 obtains, from the second storage unit, the location information that is correlated with the target person information corresponding to the registree information 321.

After the process of ACT150 is performed, the operation control unit 303 determines whether or not a target registree is present in a surrounding area, based on the location information (ACT160). The surrounding area is the surrounding area of the image forming apparatus 100. The location information is obtained by the location information obtaining unit 305 in ACT150. The operation control unit 303 performs the following processes in a case where the location information is determined to indicate that the target registree is not present (NO in ACT160). In that case, the operation control unit 303 determines that the target registree is not present in the surrounding area. Then, the location information obtaining unit 305 transitions to ACT140 and selects an unselected registree of one or more registrees indicated by the registree information 321 as the target registree. The unselected registree is a person who is subsequently determined to be or not to be present in a surrounding area by the control unit. The operation control unit 303 determines that the all target registree is not present in the surrounding area and transitions to ACT170 in a case where there is no unselected registree in ACT140. Thus, the process is repeated until all registrees are determined to be not present or one target registree is determined to be present.

In ACT160, the operation control unit 303 may also perform the determination of ACT160 based on the above in-time operation information. Specifically, the operation control unit 303 obtains the in-time operation information of the target registree from the server S2 in ACT150. The operation control unit 303 determines whether or not the target registree is present in a surrounding area, based on the obtained in-time operation information of the target registree. The surrounding area is the surrounding area of the image forming apparatus 100. The operation control unit 303 determines the target registree to be present in the surrounding area in a case where the target registree's PC is operated in the predetermined amount of time. Likewise, the operation control unit 303 determines the target registree not to be present in the surrounding area in a case where the PC is not operated in the predetermined amount of time.

In ACT170, the operation control unit 303 operates the driving unit to drive the mechanism in a second operating mode (ACT170) and ends the process. The process of ACT170 will be described. In the second operating mode, the speed at which the part is driven is equal to a predetermined speed. Hereinafter, the speed in the second operating mode will be referred to as a normal speed for convenience of description. That is, in this example, the operation control unit 303 sets the speed at which each of the sheet transport roller and the fixing roller is driven to the normal speed in the second operating mode. Then, the operation control unit 303 drives each of the sheet transport roller and the fixing roller at the normal speed. More specifically, the operation control unit 303 causes the sheet transport roller to transport the sheet at a predetermined normal transport speed in the second operating mode. The operation control unit 303 drives the fixing roller at a predetermined normal operating speed in the second operating mode. The second operating mode in this example is a normal operating mode.

The operation control unit 303 performs the following processes in a case where the operation control unit 303 determines the target registree to be present in the surrounding area based on the location information and/or the in-time operation information (YES in ACT160). The operation control unit 303 operates at least a portion of mechanisms driven by the driving unit in the first operating mode (ACT180) and ends the process. The process of ACT180 will be described. As described above, in the first operating mode, the portion of the driving unit is quietly operated compared with a case where a registree is determined not to be present in a surrounding area. The surrounding area is the surrounding area of the image forming apparatus 100. The portion being quietly operated in this example indicates that the portion is operated at a lower speed than the normal speed by switching the speed at which the portion is driven to the lower speed. That is, the first operating mode is an operating mode in which the speed at which the portion is driven is equal to a quiet speed that is lower than the normal speed. That is, in this example, the operation control unit 303 sets the speed at which each of the sheet transport roller and the fixing roller is driven to the quiet speed in the first operating mode. Then, the operation control unit 303 drives each of the sheet transport roller and the fixing roller at the quiet speed. More specifically, the operation control unit 303 causes the sheet transport roller to transport the sheet at a quiet transport speed lower than the normal transport speed in the first operating mode. The operation control unit 303 operates the fixing roller at a quiet operating speed lower than the normal operating speed in the first operating mode. The first operating mode in this example is a quiet operating mode. The operation control unit 303 may set at least the quiet transport speed or the quiet operating speed in the first operating mode. Setting the quiet transport speed means setting the transport speed of the sheet transport roller to the quiet transport speed. Setting the quiet operating speed means setting the operating speed of the fixing roller to the quiet operating speed.

As described heretofore, the image forming apparatus 100 obtains the location information that indicates the location of the registree. The location information in one example is schedule information. The image forming apparatus 100 determines whether or not the registree is present in a surrounding area, based on the obtained location information. The surrounding area is the surrounding area of the image forming apparatus 100. The image forming apparatus 100, in a case where the registree is determined to be present in the surrounding area, drives the at least a part of the driving unit in the first operating mode. Accordingly, the image forming apparatus 100 can be rendered quiet during operation.

The image forming apparatus 100 may be configured not to select an instructing person as the target registree in ACT140 illustrated in FIG. 4. The instructing person instructs the image forming apparatus 100 to form an image. The reason of the configuration is that the instructing person who is a person operating the image forming apparatus 100 is highly unlikely to feel that the operating sound of the image forming apparatus 100 is uncomfortable. The instructing person is, for example, a person who is assigned to use a PC that sends print data to the image forming apparatus 100. In this case, the image forming apparatus 100 stores, in advance, information in which an IP address assigned to a PC in the office is correlated with ID indicating a registree. The instructing person, for example, performs a printing operation on the image forming apparatus 100 by using the control panel 120. In this case, authentication is performed in the image forming apparatus 100 when the operation is performed. The authentication is, for example, authentication using an ID card that is assigned to a person who operates the control panel 120.

The image forming apparatus 100 may obtain information with respect to electronic mail or instant messaging software and perform the following processes based on the obtained information. In this case, the image forming apparatus 100, for example, determines whether or not the target registree holds a web conference, based on the obtained information. The image forming apparatus 100, in a case where the target registree holds a web conference, drives the portion of the mechanisms driven by the driving unit in the first operating mode.

The image forming apparatus 100 may change the quiet speed in the first operating mode according to the distance between the image forming apparatus 100 and the registree. In this case, the location information includes target person distance information that is correlated with each target person information. The target person distance information indicates the distance between the seat of the target person indicated by the target person information and the image forming apparatus 100. In that case, the image forming apparatus 100 stores, in advance, a correspondence table illustrated in FIG. 5 in the first storage unit 320.

Figure 5:
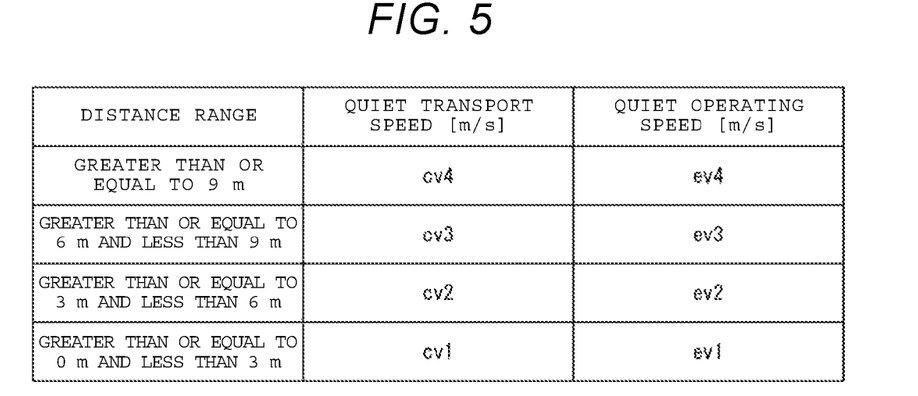
FIG. 5 is a diagram illustrating one example of a correspondence table.

FIG. 5 is a diagram illustrating one example of the correspondence table. The correspondence table stores a distance range, a quiet transport speed, and a quiet operating speed in correlation with each other. The distance range includes two or more distance ranges that are determined in advance. The quiet transport speed corresponds to each distance range and is determined in advance. The quiet operating speed corresponds to each distance range and is determined in advance. In the example illustrated in FIG. 5, a quiet transport speed cv1 and a quiet operating speed ev1 are correlated with a distance range of greater than or equal to 0 m and less than 3 m. A quiet transport speed cv2 and a quiet operating speed ev2 are correlated with a distance range of greater than or equal to 3 m and less than 6 m. A quiet transport speed cv3 and a quiet operating speed ev3 are correlated with a distance range of greater than or equal to 6 m and less than 9 m. A quiet transport speed cv4 and a quiet operating speed ev4 are correlated with a distance range of greater than or equal to 9 m. The magnitude relationship between the quiet transport speeds is such that cv1<cv2<cv3<cv4<normal transport speed. The magnitude relationship between the quiet operating speeds is such that ev1<ev2<ev3<ev4<normal operating speed. The correspondence table may store another type of information in addition to the distance range, the quiet transport speed, and the quiet operating speed. The distance range may include, for example, three or less distance ranges or five or more distance ranges instead of the four distance ranges illustrated in FIG. 5. The above relationship of the quiet transport speeds may be another relationship. The above relationship of the quiet operating speeds may be another relationship.

The image forming apparatus 100 changes the quiet speed according to the distance between the image forming apparatus 100 and the registree based on the location information and the correspondence table. Specifically, the operation control unit 303 performs the following processes in a case where the target registree is determined to be present in a surrounding area in ACT160 illustrated in FIG. 4. The surrounding area is the surrounding area of the image forming apparatus 100. The operation control unit 303 obtains the correspondence table from the first storage unit 320. The operation control unit 303 obtains the target person distance information from correspondence information that includes the target person information corresponding to the ID indicating the target registree. The operation control unit 303 determines whether or not the distance indicated by the obtained target person distance information falls within any distance range stored in the obtained correspondence table. The operation control unit 303 specifies, from the correspondence table, the quiet transport speed and the quiet operating speed that are correlated with the determined distance range. The operation control unit 303 sets the transport speed to the specified quiet transport speed and sets the operating speed to the specified quiet operating speed. The operation control unit 303 operates the mechanism driven by the driving unit in the first operating mode that is based on the set quiet transport speed and the set quiet operating speed. Accordingly, the image forming apparatus 100 can be rendered quiet according to the distance between the image forming apparatus 100 and a person in the surrounding area of the image forming apparatus 100. Particularly, the image forming apparatus 100 in this example operates the mechanism driven by the driving unit more quietly when the person in the surrounding area of the image forming apparatus 100 is closer to the image forming apparatus 100. The operation control unit 303 in this case may at least set the transport speed or set the operating speed. The image forming apparatus 100 may set the transport speed based on a quiet transport speed that is expressed as a function of distance, instead of as set forth in the correspondence table. Similarly, the image forming apparatus 100 may set the operating speed based on a quiet operating speed that is expressed as a function of distance, instead of as set forth the correspondence table.

The image forming apparatus 100 may obtain usage status information and change the speed at which a mechanism driven by the driving unit is driven according to the obtained usage status information. The usage status information indicates the usage or the non-usage of a room. The usage status information may be, for example, a room usage schedule. Alternatively, the usage status information may be, for example, attribute information similar to that set forth above in which a sensor detects body temperature, weight or vibration of a person in the room. In this example, the room is in the office and in the surrounding area of the image forming apparatus 100. The room is, for example, a conference room. The room may be another room such as a reception room. In this case, the image forming apparatus 100 includes a usage state information obtaining unit (not shown) that obtains the usage state information. Specifically, the control unit 300 includes the usage state information obtaining unit. The image forming apparatus 100 drives the mechanism driven by the driving unit in the first operating mode in a case where the usage state information obtained by the usage state information obtaining unit indicates the room is currently used. The image forming apparatus 100 drives the driving unit in the second operating mode in a case where the usage status information indicates the room is currently not used. Accordingly, the image forming apparatus 100 can be rendered quiet according to the usage status of the room in the surrounding area of the image forming apparatus 100. The first operating mode and the second operating mode in this case are the same as the first operating mode and the second operating mode described in FIG. 4, and thus will not be described. The image forming apparatus 100 may change the quiet speed according to the distance between the image forming apparatus 100 and the room in the surrounding area of the image forming apparatus 100. The usage status information is stored in the second storage unit by an application program such as the above schedule information application. In this case, the application program obtains the usage status information from a server S3. The server S3 is another server that is communicably connected to the image forming apparatus 100 and in which the application program is installed. The server S3 stores the usage status information of each room in the office. For example, the server S3 stores the usage status information that indicates the usage or the non-usage of each room in the off ice by a person in the office.

Types of portable terminals in the above description include a multifunction portable phone terminal (smartphone), a portable phone terminal, and the like. Types of the portable terminals include a tablet terminal, a personal data assistant (PDA), and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a driving unit configured to drive at least one mechanism of the image processing apparatus,
   a network interface configured to receive location information which indicates the presence or absence of a person in a surrounding area of the image forming apparatus at a time of a requested function of the image processing apparatus; and
   a control unit configured to:
   determine, based on the received location information, whether the person is present in the surrounding area of the image forming apparatus, and control the driving unit so that, upon determining that the person is present in the surrounding area, the at least one mechanism is driven in a first operating mode, and, upon determining that the person is not present in the surrounding area, the at least one mechanism is driven in a second operating mode,
   wherein the at least one mechanism generates noise at a first volume when driven in the first mode and at a second volume louder than the first volume when driven in the second mode.

2. The apparatus according to claim 1, wherein, in the first operating mode, the at least one mechanism is driven at a first speed, and in the second operating mode, the at least one mechanism is driven at a second speed higher than the first speed.

3. The apparatus according to claim 2, wherein the control unit is further configured to:
   determine a distance between the image forming apparatus and the person, and
   when the at least one mechanism is driven in the first mode, control the driving unit such that the first speed is a function of the determined distance in which the first speed decreases as the determined distance decreases.

4. The apparatus according to claim 1, wherein the at least one mechanism includes at least one of an original document transport roller that transports an original document, an original document transport motor, a polygon mirror that reflects a laser beam which forms an electrostatic latent image on a photoreceptor, a development roller, a toner agitation member, a transfer roller, a fixing roller, a fixing belt, a sheet transport roller that transports a sheet, and a sheet transport motor.

5. The apparatus according to claim 1, further comprising:
a control panel configured to receive an instruction to perform an operation including driving of the at least one mechanism,
wherein, when the person is determined to be present in the surrounding area and when the instruction is received in the control panel, the driving unit is controlled so that the at least one mechanism is driven in the second driving mode.

6. The apparatus according to claim 1, wherein the location information is schedule information that includes a schedule of the person.

7. The apparatus according to claim 1, wherein the location information is sensor information detecting one of: a weight over a predetermined weight threshold, a body temperature over a predetermined temperature threshold, and a vibration of a predetermined object.

8. The apparatus according to claim 1, wherein the location information is biometric information of the person detected in the surrounding area of the image forming apparatus.

9. The apparatus according to claim 1, wherein the location information indicates whether a computer associated with the person is currently operated.

10. The apparatus according to claim 1, wherein:
the network interface receives the location information corresponding to each of a plurality of people, and
the control unit:
determines, based on the received location information corresponding to each of the plurality of people, whether at least one person is present in the surrounding area of the image forming apparatus, and
controls the driving unit so that, when at least one person is determined to be present in the surrounding area, the at least one mechanism is driven in the first mode, and when none of the plurality of people are determined to be present in the surrounding area, the at least one mechanism is driven in the second mode.

11. A method of controlling an image processing apparatus comprising the steps of:
receiving location information which indicates the presence or absence of a person in a surrounding area of the image forming apparatus at a time of a requested function of the image processing apparatus;
determining, based on the obtained location information, whether the person is present in the surrounding area; and
controlling a driving unit that drives at least one mechanism of the image forming apparatus so that, upon determining that the person is present in the surrounding area, the at least one mechanism is driven in a first operating mode causing noise at a first volume, and, upon determining that the person is not present in the surrounding area, the at least one mechanism is driven in a second operating mode,
wherein the at least one mechanism generates noise at a first volume when driven in the first mode and at a second volume louder than the first volume when driven in the second mode.

12. The method according to claim 11, wherein, in the first operating mode, the at least one mechanism is driven at a first speed, and in the second operating mode, the at least one mechanism is driven at a second speed higher than the first speed.

13. The method according to claim 12, further comprising the step of:
determining a distance between the image forming apparatus and the person, wherein
when the at least one mechanism is driven in the first mode, the driving unit is controlled so that the first speed is a function of the determined distance in which the first speed decreases as the determined distance decreases.

14. The method according to claim 11, wherein the at least one mechanism includes at least one of an original document transport roller that transports an original document, an original document transport motor, a polygon mirror that reflects a laser beam which forms an electrostatic latent image on a photoreceptor, a development roller, a toner agitation member, a transfer roller, a fixing roller, a fixing belt, a sheet transport roller that transports a sheet, and a sheet transport motor.

15. The method according to claim 11, wherein the location information is schedule information that includes a schedule of the person.

16. The method according to claim 11, wherein the location information is one of:
sensor information detecting one of: a weight over a predetermined weight threshold, a body temperature over a predetermined temperature threshold, and a vibration of a predetermined object,
biometric information of the person detected in the surrounding area of the image forming apparatus, and
use information that indicates whether a computer associated with the person is currently operated.

17. The method according to claim 11, further comprising:
receiving location information for each of a plurality of people; and
determining, based on the obtained location information corresponding to each of the plurality of people, whether at least one person is present in the surrounding area of the image forming apparatus, wherein
the driving unit is controlled so that, when at least one person is determined to be present in the surrounding area, the at least one mechanism is driven in the first mode, and when none of the plurality of people are determined to be present in the surrounding area, the at least one mechanism is driven in the second mode.

18. An image processing apparatus comprising:
a driving unit configured to drive at least one mechanism of the image processing apparatus,
a network interface configured to receive room usage status information which indicates whether a room in a surrounding area of the image forming apparatus is being used at a time of a requested function of the image processing apparatus; and
a control unit configured to:
determine, based on the received room usage status information, whether the room is being used at the time of the requested function, and
control the driving unit so that, upon determining that the room is being used, the at least one mechanism is driven in a first operating mode, and, upon determining that the room is not being used, the at least one mechanism is driven in a second operating mode, wherein the at least one mechanism generates noise at a first volume when driven in the first mode and at a second volume louder than the first volume when driven in the second mode.

19. The apparatus according to claim 18, wherein the room usage status information is one of a room usage schedule and sensor information detecting one of: a weight over a predetermined weight threshold, a body temperature over a predetermined temperature threshold, and a vibration of a predetermined object.

20. The apparatus according to claim 18, wherein the network interface receives the room usage status information for each of a plurality of rooms in a surrounding area of the image forming apparatus, and the control unit:

determines, based on the received room usage status information corresponding to each of the plurality of rooms, whether at least one of the rooms is being used, and controls the driving unit so that, when at least one of the plurality of rooms is determined to be being used, the at least one mechanism is driven in the first mode, and when none of the plurality of rooms are determined to be being used, the at least one mechanism is driven in the second mode.

* * * * *